United States Patent
Balzar

(10) Patent No.: US 12,319,205 B2
(45) Date of Patent: Jun. 3, 2025

(54) DEVICE FOR A VEHICLE AND VEHICLE

(71) Applicant: WITTE Automotive GmbH, Velbert (DE)

(72) Inventor: David Balzar, Solingen (DE)

(73) Assignee: Witte Automotive GmbH, Velbert (DE)

( * ) Notice: Subject to any disclaimer, the term of this patent is extended or adjusted under 35 U.S.C. 154(b) by 313 days.

(21) Appl. No.: 18/161,912

(22) Filed: Jan. 31, 2023

(65) Prior Publication Data
US 2023/0242048 A1    Aug. 3, 2023

(30) Foreign Application Priority Data

Jan. 31, 2022 (DE) .................... 10 2022 200 983.5
Apr. 14, 2022 (DE) .................... 10 2022 203 794.4

(51) Int. Cl.
*B60R 11/04* (2006.01)
*H04N 23/51* (2023.01)
*B60R 11/00* (2006.01)

(52) U.S. Cl.
CPC ............ *B60R 11/04* (2013.01); *H04N 23/51* (2023.01); *B60R 2011/004* (2013.01); *B60R 2011/0085* (2013.01)

(58) Field of Classification Search
None
See application file for complete search history.

(56) References Cited

U.S. PATENT DOCUMENTS

| | | | |
|---|---|---|---|
| 9,725,049 B2 * | 8/2017 | Buschmann | G08B 13/19632 |
| 10,906,394 B2 * | 2/2021 | Witte | B60K 15/05 |
| 2009/0309971 A1 * | 12/2009 | Schuetz | E05B 81/78 |
| | | | 292/201 |
| 2015/0258944 A1 * | 9/2015 | Buschmann | H04N 23/54 |
| | | | 348/373 |

(Continued)

FOREIGN PATENT DOCUMENTS

| | | |
|---|---|---|
| DE | 102010060573 A1 | 5/2012 |
| DE | 102012109611 A1 | 4/2014 |

(Continued)

OTHER PUBLICATIONS

European Patent Office, Extended European Search Report for Application No. EP23154168, dated Jun. 20, 2023, 9 pages.
(Continued)

*Primary Examiner* — Cynthia Segura
(74) *Attorney, Agent, or Firm* — Marshall & Melhorn, LLC

(57) ABSTRACT

A device for a motor vehicle may have a base support with an opening and a movable closure element for opening or closing the opening. The device may also have a sensor unit with a housing unit holding this sensor unit, which is movably arranged in the base support. The device may also have a link mechanism. The housing unit may be movable via the link mechanism in the base support between a first position and a second position in which the housing unit with the sensor unit projects at least partially out of the opening. The link mechanism may be designed as a multi-link mechanism and having at least three links. A first link and a second link are each articulated between the housing unit and the base support and a third link is articulated between the housing unit and the closure element.

15 Claims, 18 Drawing Sheets

(56) References Cited

U.S. PATENT DOCUMENTS

| | | | | |
|---|---|---|---|---|
| 2015/0258945 A1* | 9/2015 | Schutz | .................. | H04N 23/54 |
| | | | | 348/373 |
| 2016/0236558 A1* | 8/2016 | Koseki | .................. | H04N 23/51 |
| 2020/0269772 A1* | 8/2020 | Schuetz | ............... | G03B 11/043 |
| 2023/0123315 A1* | 4/2023 | Huelsen | .................. | G01S 7/481 |
| | | | | 340/937 |

FOREIGN PATENT DOCUMENTS

| | | | |
|---|---|---|---|
| DE | 102013111224 A1 | | 4/2014 |
| DE | 102015106394 A1 | | 10/2016 |
| DE | 102017117024 A1 | | 1/2019 |
| EP | 2523830 B1 | | 10/2014 |

OTHER PUBLICATIONS

German Patent and Trademark Office, Search Report in Application No. DE 10 2022 203 794.4, dated Dec. 6, 2022, 7 pages, Munich, Germany.

* cited by examiner

DEVICE FOR A VEHICLE AND VEHICLE

FIELD

The invention relates to a device for a vehicle, in particular a motor vehicle, with a movable sensor unit. Furthermore, the invention relates to a vehicle with such a device.

BACKGROUND

Devices of the aforementioned type are known from the prior art, in particular an extension kinematics of a sensor unit, in which the sensor unit, for example a camera, extends via sliding guides or slideways. Such devices require a lot of installation space, in particular a large installation depth, and lead to noise.

The object of the present invention is to provide an improved device which is simple and as quiet as possible. Furthermore, a vehicle with such an improved device is to be specified.

SUMMARY

With regard to the device for a vehicle and the vehicle, the object is achieved according to the invention by the features of the patent claims.

A device according to the invention for a vehicle comprises at least one base support with an opening and a movable closure flap for releasing or closing the opening, a sensor unit without a housing unit or with a housing unit which at least partially encloses and holds this sensor unit and which is arranged movably in the base support, and an link mechanism, wherein the sensor unit or the housing unit can be moved by means of the link mechanism in the base support between a first position, in particular a rest position of the sensor unit, and a second position, in particular an operating position of the sensor unit, in which the sensor unit or the housing unit with the sensor unit protrudes at least partially out of the opening, and wherein the articulation mechanism is designed as a multi-link mechanism and comprises at least three links and wherein two of the three links are each articulated with a first link end in a stationary manner on the base support and are each articulated with a second link end in a movable manner on the housing unit or the sensor unit, and a third link is articulated between the housing unit and the closure element or between the base support and the closure element.

Such a multi-link mechanism features low-backlash swivel joints instead of pins or rollers in guideways or slotted links. With such a multi-link mechanism (also called multi-link kinematics), sliding points and friction points can be reduced or even avoided.

In addition, such a stationary linkage on the carrier side or vehicle side of two of the three links and a movable linkage on the housing side or sensor side of these two links enables a particularly small passage opening for the sensor unit. A stationary linkage of the two links to the base support is understood to mean in particular a stationary pivotable mounting of the first link end on the base support. A movable linkage of the two links on the housing unit or directly on the sensor unit is understood to mean in particular a pivotable mounting of the second link end on the housing unit or on the sensor unit and a movable mounting relative to the base carrier or to a vehicle skin.

The multi-link mechanism can, for example, be designed and set up in such a way that the housing unit performs a continuous arc-shaped extension movement when moving from the rest position of the sensor unit into the operating position of the sensor unit.

Preferably, the multi-link mechanism is designed and set up in such a way that simultaneously with an extension movement of the sensor unit or the housing unit with the sensor unit from the rest position into the operating position, the closure element can be moved from a position closing the opening for the sensor unit into a position opening the opening for the sensor unit.

The links may, for example, each be designed as a simple link, in particular a simple rod link or a simple bow link, each with two joints, wherein a first link and a second link are each articulated between the housing unit and the base support and a third link is articulated between the housing unit and the closure flap.

The link mechanism can be designed and set up as a multi-link mechanism in such a way that the sensor unit or the housing unit executes a combined translational movement and rotational movement as well as pivoting movement when moving from the first position, in particular a rest position of the sensor unit, into the second position, in particular an operating position of the sensor unit.

The link mechanism as a multi-link mechanism comprises at least two links, which are each articulated with a first link end on a stationary pivot axis on the base carrier and are each articulated with a second end on a movable pivot axis on the housing unit or the sensor unit. In this case, the second link ends of the at least two links can be pivoted or swivelled in the same direction with respect to the respective associated first link end, in particular the respective stationary first link end. In particular, the sensor unit or the housing unit with the sensor unit is mounted on the base support so as to be movable, in particular continuously arcuately movable, relative to the ends during the entire movement.

The advantages achieved with the invention consist in particular in the fact that a device with such a multi-link mechanism with simple and low-backlash links, in particular rod links or bracket links, each with two joints, in particular swivel joints, enables precise guidance and very low-noise movement of the sensor unit. In addition, such a device is insensitive to contamination, since pins and guideways as well as sliding points and friction points are avoided.

A further development of the respective device according to the invention provides that the multi-link mechanism is designed and set up in such a way that the housing unit performs a continuous extension movement, in particular a continuous arcuate extension movement, when moving from the first position, in particular a rest position of the sensor unit, to the second position, in particular an operating position of the sensor unit.

The respective links are designed, for example, as simple links with two joints each. The links are single links. For example, the respective link is formed as an L-shaped link, a U-shaped link, an I-shaped link or a rod-shaped or bow-shaped link (also called a rod link or bow link).

In another aspect, the links formed as a rod-shaped link or I-shaped link are each articulated to only one side of the housing unit. In particular, the links articulated to the housing unit are articulated to opposite sides of the housing. For example, a first link is articulated to an outer side of the housing unit. A second link is articulated to an outer side of the housing unit opposite this outer side.

For example, at least two of the links that are articulated between the sensor unit and the base support or the housing unit with the sensor unit and the base support are parallel and spaced apart in the rest position. At least one of the links which is articulated between the housing unit and the closure element is arranged in the rest position, for example, perpendicular to the opening plane or a closure plane of the closure element. Furthermore, the housing unit may have an arcuate shape.

Preferably, the sensor unit may be arranged approximately perpendicular to the opening in the rest position. Such a rest position of the sensor unit taken approximately perpendicular to the opening allows the design of the opening to be as small as possible. For example, the opening can be designed corresponding to and with a small gap to the outer circumference of the sensor unit or to the outer circumference of the housing unit with sensor unit, in particular slightly larger.

Preferably, the closure element can be rotatably arranged, in particular articulated, on the base support or on the housing unit or directly on the sensor unit.

Furthermore, the closure element can be held spring-biased in a position closing the opening for the sensor unit.

A further aspect provides for a drive, for example a motor, in particular an electric motor, which is motion-coupled directly to one of the links or indirectly to said link via an intermediate link mechanism. The link is designed as a drive link and can be driven directly by the drive, in particular a mechanical output, such as a shaft or a pinion, or indirectly by a drive lever of the intermediate link mechanism.

In the case of direct coupling of the drive and the link of the link mechanism, an output axis of the drive and a link axis of the link formed as a drive link coincide. In other words, the output axis and the link axis are formed as coaxial axes and lie on the same axis of rotation. In the case of indirect coupling of the input and the link of the link mechanism via the intermediate link mechanism, the output axis of the input and the link axis of the link are offset from each other.

With direct coupling, the drive and the link move in the same direction. With indirect coupling, the drive, a drive lever of the intermediate link mechanism and the link designed as a drive link can move in the same direction.

In the case of indirect coupling of the drive and the link, the intermediate link mechanism is arranged between the drive and the link, which is designed as a drive link. The intermediate link mechanism can, for example, be designed as a toggle lever mechanism. In particular, it is a toggle mechanism with a dead centre position. In the extended state (also called operating position) and/or in the retracted state (also called rest position) of the sensor unit (in particular of a camera), the extended sensor unit or the retracted sensor unit, respectively, is securely fixed (also called "locked"). In particular, the sensor unit is fixed in one of its end positions by means of the intermediate link mechanism in such a way that this position cannot be opened or closed simply by hand or by vehicle vibrations. Alternatively, a self-locking gear can be provided instead of the toggle mechanism. In this case, however, noise problems may arise. Furthermore, such a self-locking gearbox may have a poorer efficiency.

A first lever of the toggle mechanism is designed as a drive lever and a second lever as a driven lever. The drive lever is coupled to the drive, in particular its mechanical output. The driven lever is in turn coupled to the link, which is designed as a drive link.

Preferably, the toggle mechanism can be designed as a bistable toggle mechanism. For example, the bistable toggle mechanism may have two positions: a first stable position and a second stable position. The first stable position corresponds to the rest position of the sensor unit and/or the closing position of the closure element. The second stable position corresponds to the operating position of the sensor unit and/or the releasing position of the closure element.

The movement of the drive directly or indirectly via the intermediate link mechanism causes the link, which is designed as a drive link, to slide along an, for example, arc-shaped, circular-segment-shaped or curved surface, in particular a guide rib, of the base carrier between the rest position and the operating position. By designing the intermediate link mechanism as a bistable toggle mechanism, it can be fixed in its end positions, the rest position and the operating position, respectively.

Furthermore, the lock may comprise at least one end stop for limiting an extension movement or a retraction movement of the housing unit with sensor unit or of the sensor unit.

For example, at least one of the links may have one or more projections which form the one end stop or several, for example two, end stops for limiting an extension movement or a retraction movement of the housing unit with sensor unit or of the sensor unit.

Alternatively, the at least one end stop can be designed as a separate end stop. For example, the separate end stop can be provided on the base support at a corresponding stop position for limiting the relevant movement (extension movement or retraction movement). In a particularly simple embodiment, a link bearing of the link of the link mechanism, which is designed as a drive link, can simultaneously be designed as an end stop for the intermediate link mechanism.

Furthermore, a vehicle is provided with the device according to the invention described above, wherein the device is arranged, for example, in the rear region or front region of the vehicle.

DESCRIPTION OF THE FIGURES

Examples of embodiments of the invention are explained in more detail with reference to drawings.

DETAILED DESCRIPTION

Corresponding parts are marked with the same reference signs in all figures.

Figure 1:
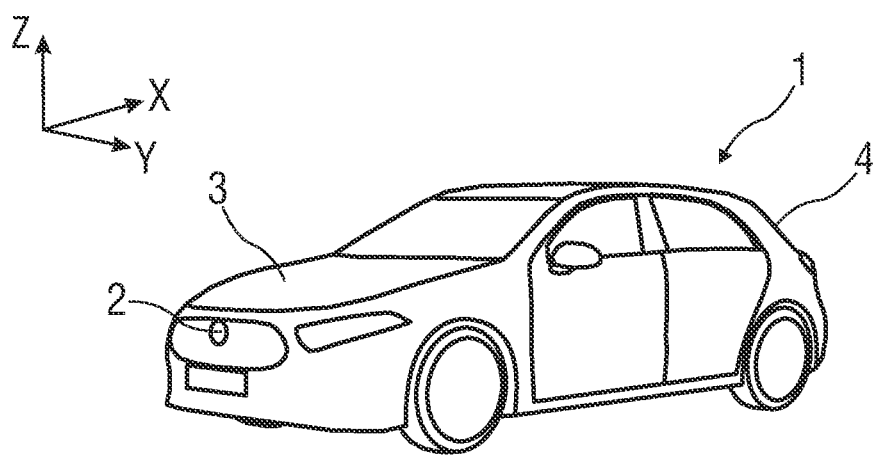
FIG. 1 schematically shows a vehicle with a device according to the invention.

FIG. 1 schematically shows a vehicle 1 with a device 2 according to the invention. For example, the device 2 is arranged at the front of an engine bonnet 3 and/or at the rear of a boot lid 4. In the embodiment example shown, the device 2 is arranged on the bonnet 3.

The device 2 has a closed position and a fully open position in which an environment of the vehicle 1 can be detected. FIG. 1 shows the device 2 in the closed position. The device 2 is designed as a pre-assembled assembly unit which can be arranged and fastened to the vehicle 1 in the pre-assembled state.

The vehicle 1 shown schematically in FIG. 1 is described below using three spatial directions running perpendicular to each other. A longitudinal direction X runs largely horizontally and preferably parallel to a longitudinal direction of the vehicle which corresponds to the normal direction of travel of the vehicle 1. A transverse direction Y running perpendicular to the longitudinal direction X is also horizontally aligned in the vehicle 1 and runs parallel to a transverse direction of the vehicle. A vertical direction Z runs perpendicular to the longitudinal direction X and perpendicular to the transverse direction Y. In the vehicle 1, the vertical direction Z preferably runs parallel to a vehicle vertical axis.

The position and direction information used, such as front, rear, top and bottom, refers to the viewing direction of a passenger sitting in the vehicle 1 in a normal sitting position and looking in the direction of travel.

Figure 2:
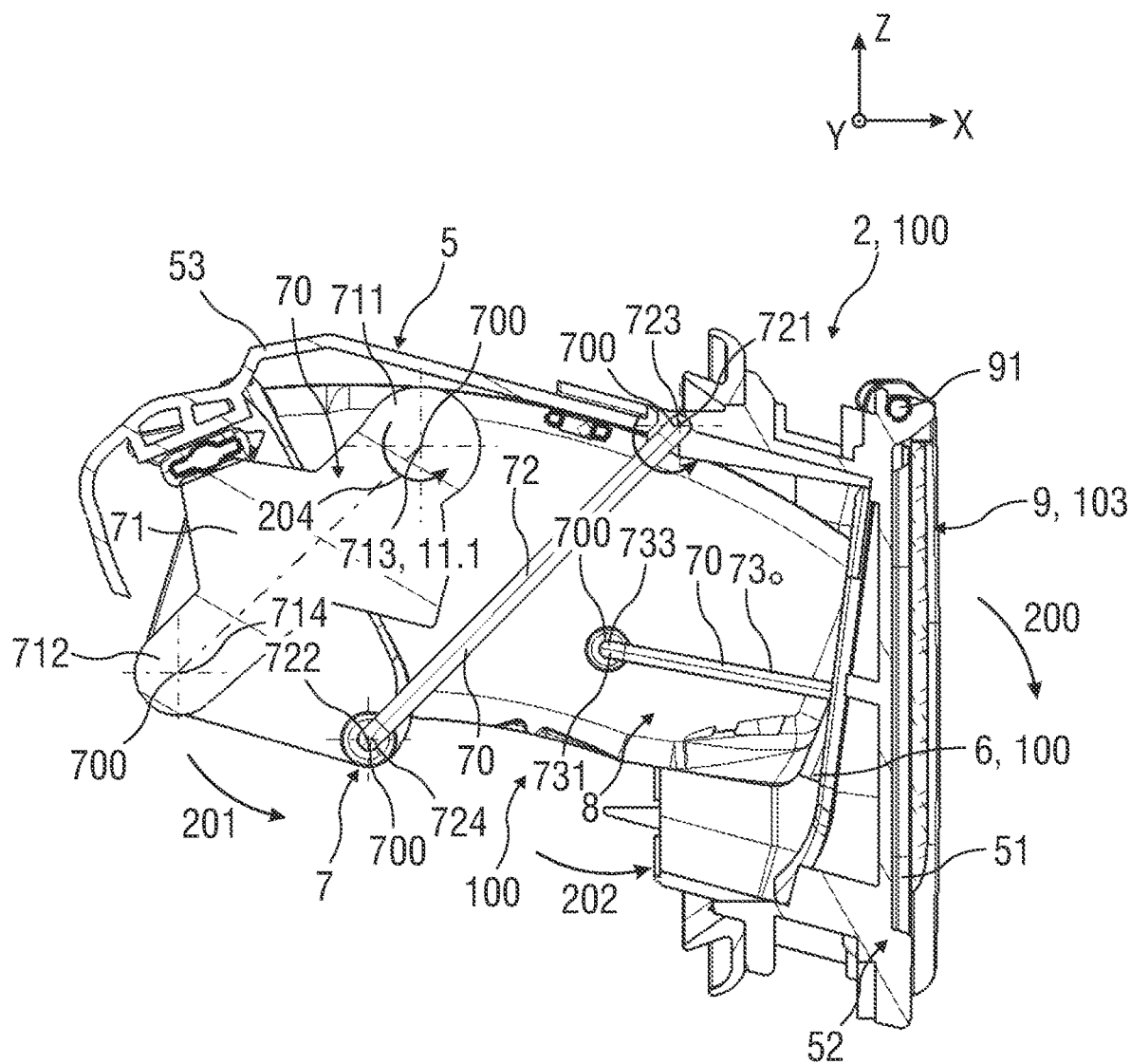
FIG. 2 is a schematic side view of a device according to the invention with a base support and a housing unit with a sensor unit in the rest position and a multi-link mechanism for adjusting the housing unit with sensor unit and with a direct drive.

FIG. 2 shows a schematic side view of the device 2 according to the invention as an assembly module. All subsequent components of the device 2 are pre-assembled to form the assembly module.

Figure 7:
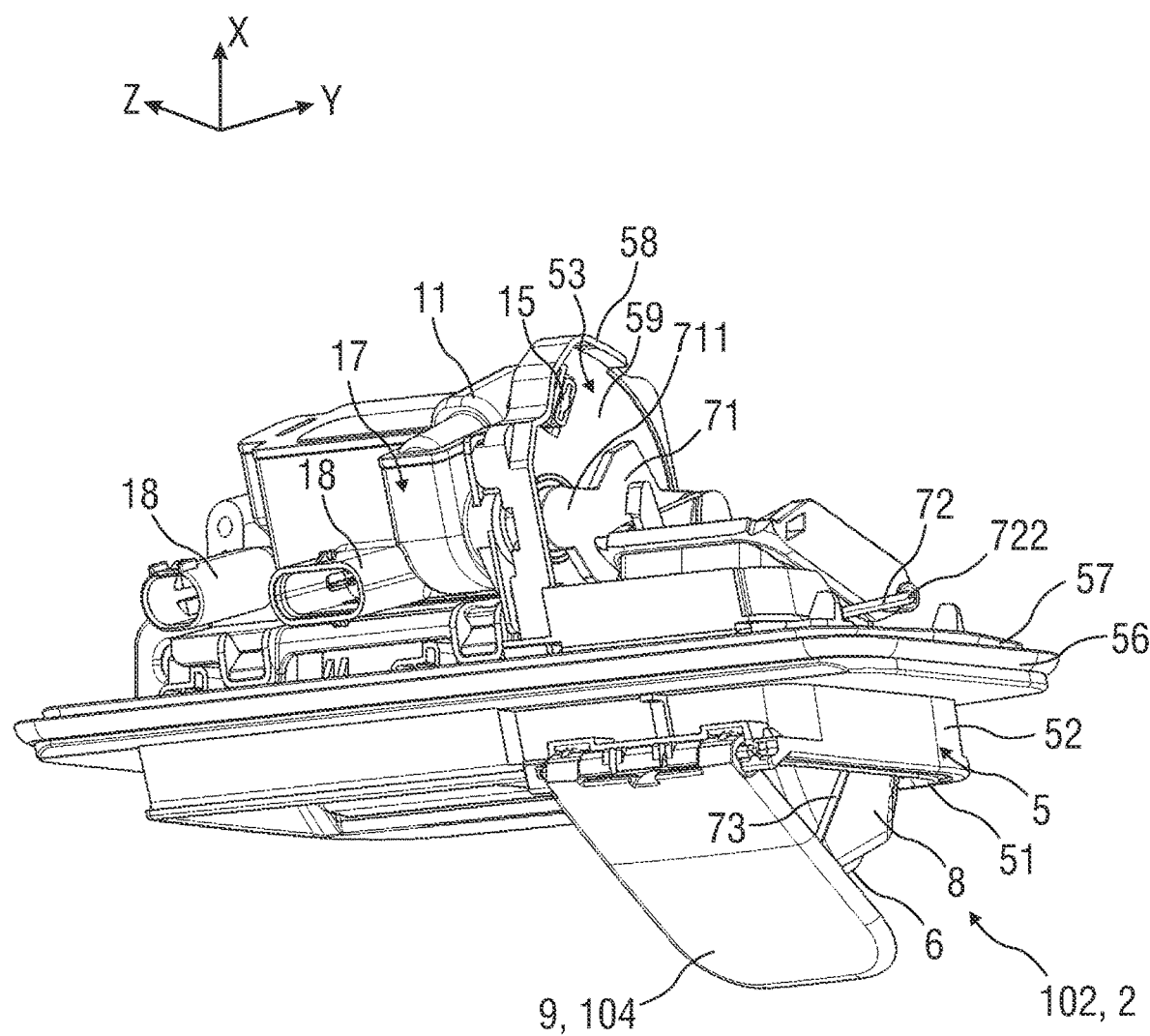
FIG. 7 is a further schematic perspective view of the device according to the invention with the housing unit with the sensor unit in the partially extended position.
Figure 8:
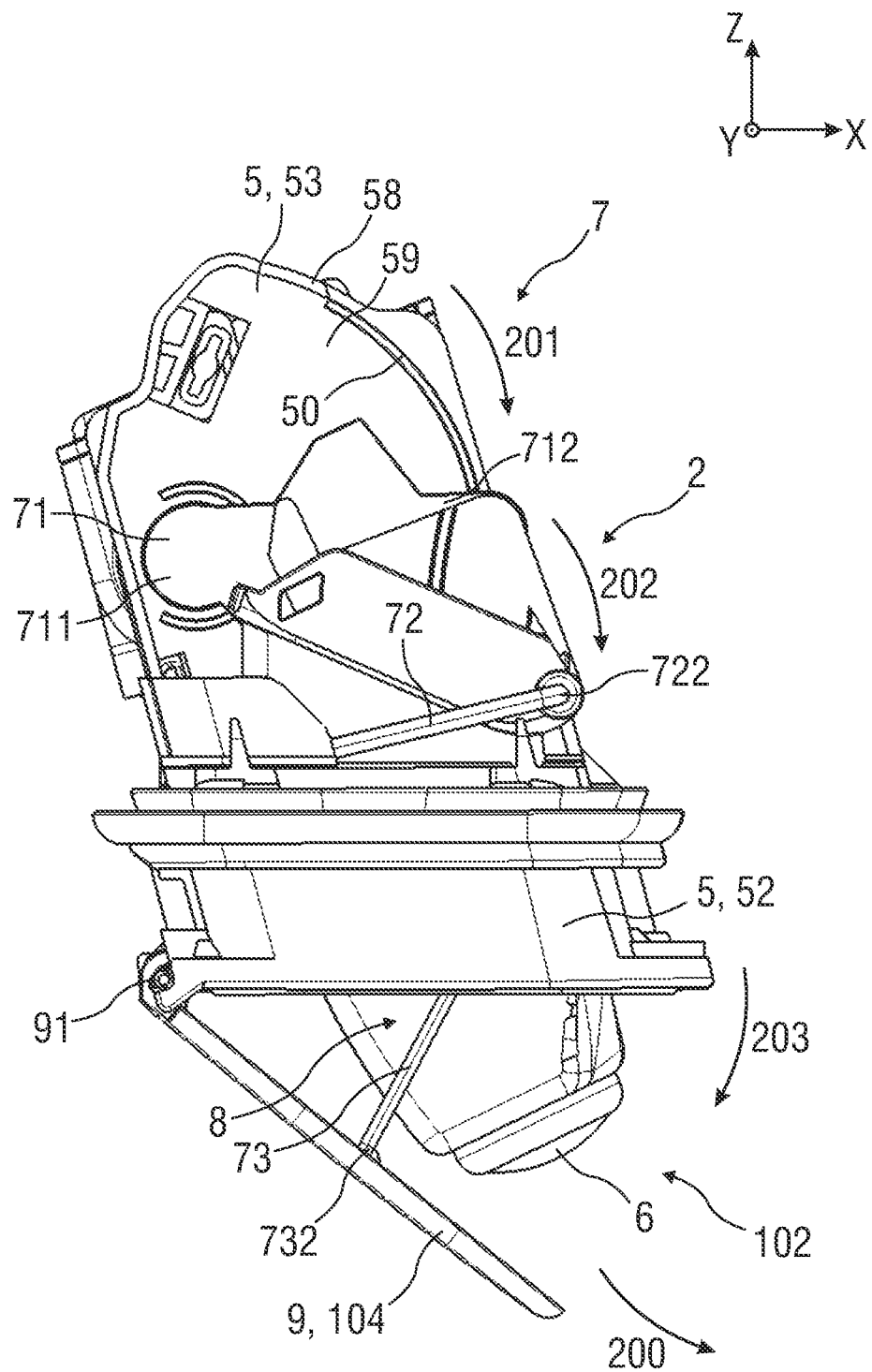
FIG. 8 is a schematic side view of the device according to the invention with the sensor unit in the partially extended position.

The device 2 comprises at least one base support 5 with a closable opening 51 shown, for example, in FIGS. 7 and 8, and a closure element 9, in particular a closure flap, movable relative to the base support 5, for opening or closing the opening 51, a sensor unit 6 and an link mechanism 7 for adjusting the sensor unit 6 relative to the base support 5.

Furthermore, the device 2 comprises a housing unit 8 which surrounds the sensor unit 6 at least in certain areas. The housing unit 8 is also designed as a holder for the sensor unit 6 and is also referred to as a sensor holder. The sensor unit 6 is protected and held in the housing unit 8. The housing unit 8 and with it the sensor unit 6 are movably arranged in the base support 5. Alternatively, the housing unit 8 can be omitted and the sensor unit 6 can be movably arranged directly in or on the base support 5. The invention is described below with reference to the housing unit 8 and the sensor unit 6 attached to it.

The housing unit 8 can be moved, in particular extended or retracted in reverse, by means of the link mechanism 7 in the base support 5 between a first position, in particular a rest position 100 (shown for example in FIGS. 2 to 5) of the sensor unit 6, and a second position, in particular an operating position 101 of the sensor unit 6 (shown for example in FIGS. 11 to 14). In the operating position 101, the housing unit 8 with the sensor unit 6 projects at least partially out of the opening 51.

In the rest position 100, the housing unit 8 with the sensor unit 6 is arranged in the base support 5 behind the opening 51 and protected by means of the locking element 9 covering the opening 51. In the rest position 100, the sensor unit 6 is arranged approximately perpendicular to the opening 51. Such an arrangement allows for a small opening 51.

In the embodiment example shown, the closure element 9 is rotatably arranged on the base support 5. Alternatively, the closure element 9 can be rotatably arranged on the housing unit 8 or the sensor unit 6 (not shown in more detail).

The closure element 9 is movable between a position 103 closing the opening 51 (shown in FIGS. 2 to 5) and a position 104 releasing the opening 51 (shown in FIGS. 6 to 9, 11 to 14). In the position 103 closing the opening 51, the closure element 9 is held spring-biased.

The link mechanism 7 is designed and set up in particular as a multi-link mechanism in such a way that the housing unit 8 with the sensor unit 6 or the sensor unit 6, when moving from the first position, in particular the rest position 100 of the sensor unit 6, into the second position, in particular the operating position 101 of the sensor unit 6, performs a continuous extension movement, in particular an arcuate movement 200 obliquely downwards and forwards in the direction of the opening 51 and out of the opening 51. In particular, the arcuate movement 200 of the housing unit 8 with the sensor unit 6 is composed of two arcuate partial movements 201 and 202 of the link mechanism 7 with the same directional sense. These arcuate partial movements 201 and 202 of the link mechanism 7 cause the continuous arcuate movement 200 of the housing unit 8 with sensor unit 6 or of the sensor unit 6.

In other words, the housing unit 8 with the sensor unit 6 or alternatively the sensor unit 6 (directly) is forced by means of the link mechanism 7 to perform an arcuate movement, in particular a movement on an arcuate section, for example obliquely downwards and forwards, towards and out of the opening 51. In the arcuate movement 200 (shown in FIGS. 2 and 8), a rectilinear movement or translational movement, in particular a combined lowering movement or lifting movement with a forward movement or backward movement perpendicular thereto, are superimposed on the arcuate movement 200, which is composed of two arcuate partial movements 201 and 202 of the link mechanism 7 (shown in FIGS. 2 and 8). The overall movement of the housing unit 8 with the sensor unit 6 or the sensor unit 6 alone is in particular a combined linear and rotational extending or retracting movement.

Furthermore, the link mechanism 7 designed as a multi-link mechanism can, for example, be designed and set up in such a way that simultaneously with the extension movement of the sensor unit 6 from the rest position 100 into the operating position 101, the closure element 9 can be moved from the position 103 closing the opening 51 into the position 104 releasing the opening 51.

The link mechanism 7, which is designed as a multi-link mechanism, can also be designed and set up, for example, in such a way that, simultaneously with the retraction movement of the sensor unit 6 from the operating position 101 into the rest position 100, the closure element 9 can be moved from the position 104 releasing the opening 51 into the position 103 closing the opening 51.

The link mechanism 7 is in particular designed as a multi-link mechanism and comprises at least two links 70, each of which is designed as a single link 70 with two joints 700, in particular swivel links.

The at least two links 70, in particular a first link 71 and a second link 72, are, for example, each articulated with a first link end 711 or 721 on a stationary axis of rotation 713 or 723 on the base support 5 and each articulated with a second link end 712 or 722 on a movable axis of rotation 714 or 724 on the housing unit 8.

The second link ends 712 and 722 of the at least two links 70, in particular 71 and 72, can be moved, in particular pivoted, in the same direction relative to the associated first, in particular stationary, link end 711 or 721. The two second link ends 712 and 722 perform the arcuate partial movements 201 and 202 respectively, which are performed in the same direction about the stationary axes of rotation 713 and 723 of the first link ends 711 and 721 respectively and are superimposed to form the continuous arcuate movement 200 of the housing unit 8.

The two links 70, in particular the first link 71 and the second link 72, which are articulated between the housing unit 8 and the base support 5, are arranged parallel and at a distance from each other in the rest position 100. This enables a particularly compact design.

Figure 3:
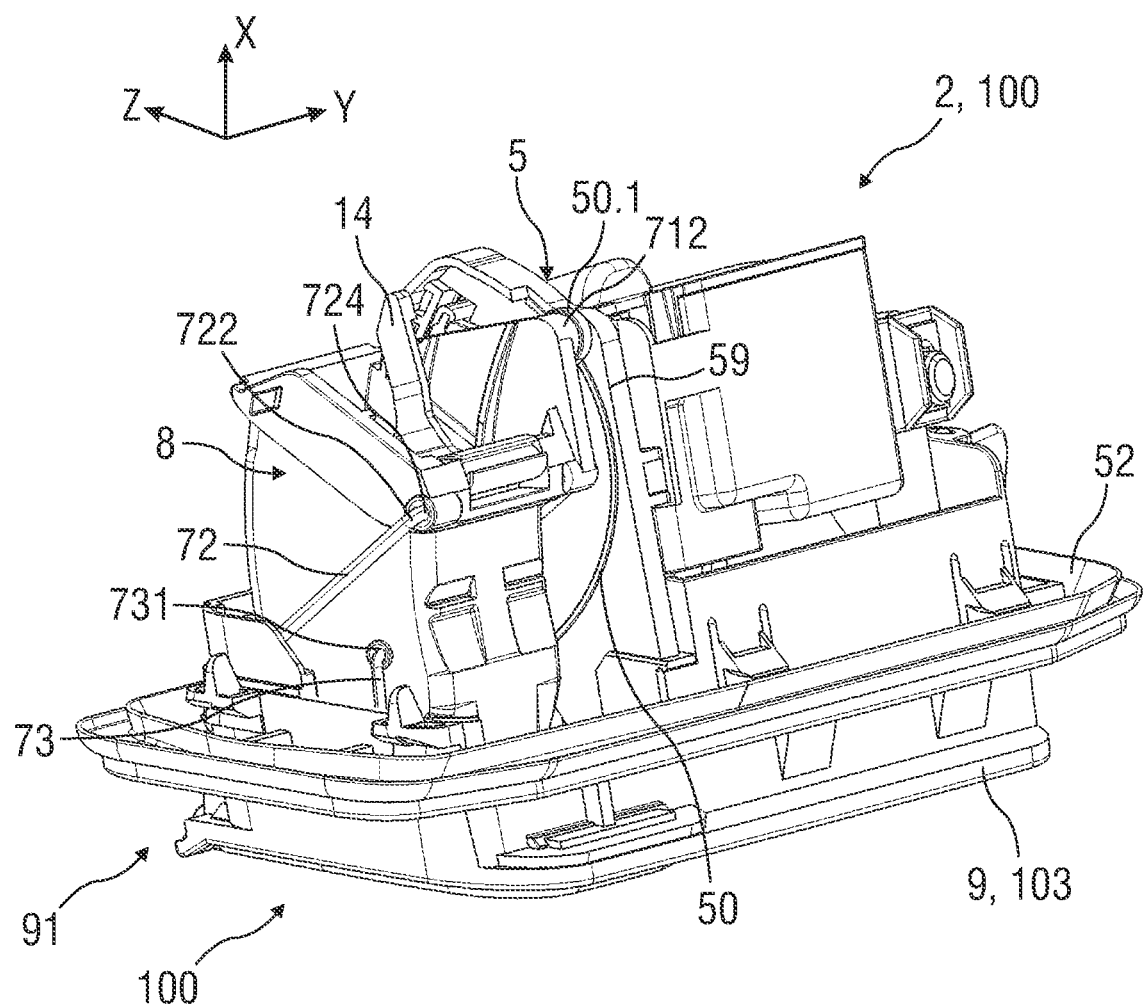
FIG. 3 is a schematic perspective view of the device according to the invention.
Figure 6:
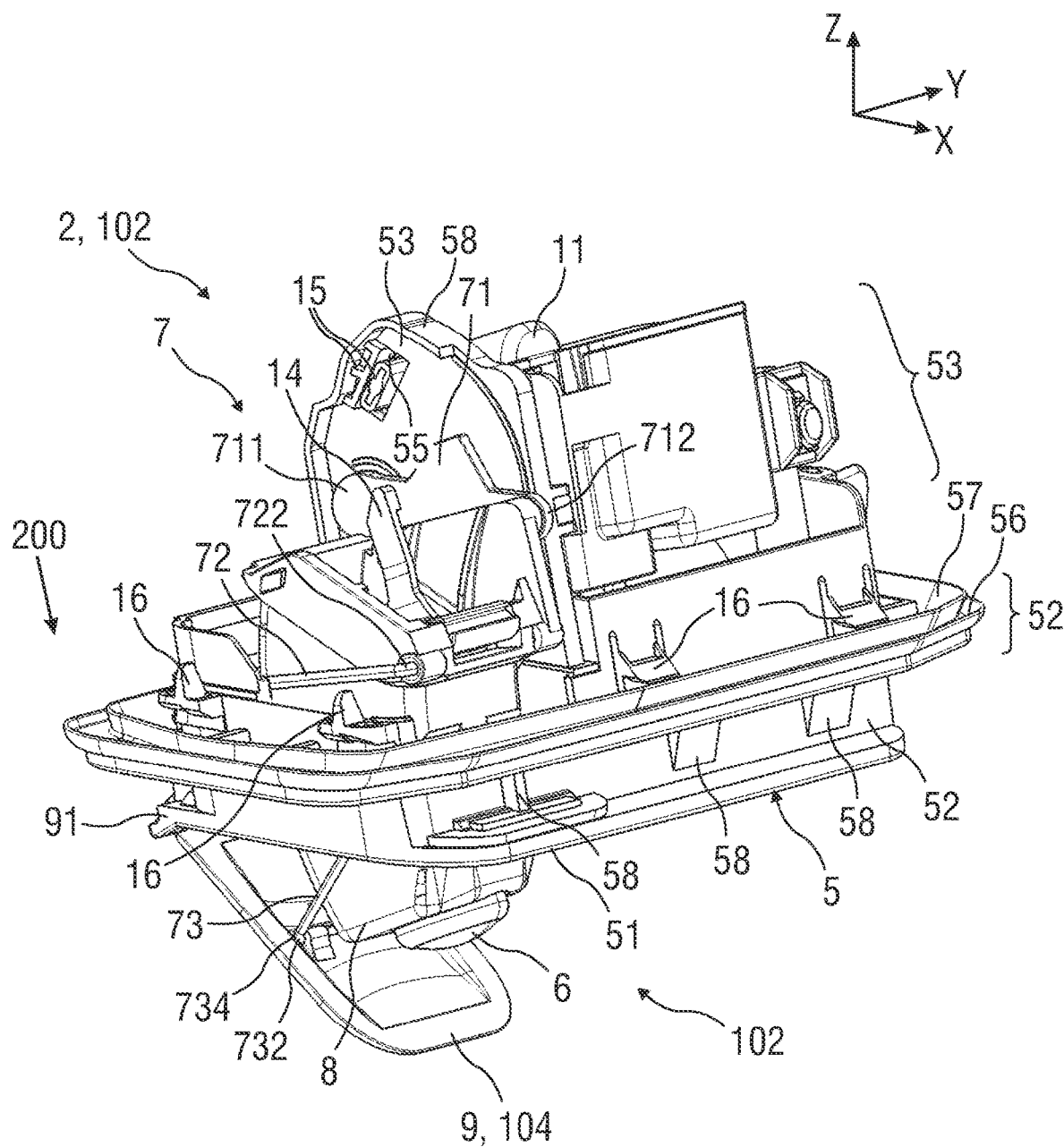
FIG. 6 is a schematic perspective view of the device according to the invention with the housing unit with the sensor unit in a partially extended position.

The device 2 has a drive 11, in particular a motor, such as an electric motor, (shown in FIGS. 3 and 6, 7). The first link 71 is designed as a drive link. A mechanical output, for example an output pinion or a mechanical output shaft, of the drive 11 is directly coupled to the first link 71. When the drive 11 and the first link 71 of the link mechanism 7 are directly coupled, an output axis 11.1 of the drive 11 and a link axis (=the stationary axis of rotation 713) of the first link 71, which is designed as a drive link, coincide. In other words, the output axis 11.1 of the drive 11 and the stationary link axis or axis of rotation 713 of the first link 71 are designed as coaxial axes and lie on the same axis of rotation. With this direct coupling of the drive 11 and the first link 71, the drive 11 and the first link 71 move in the same direction of rotation 204 about the same axis of rotation, which corresponds to the stationary axis of rotation 713.

The movement of the drive 11 causes the first link 71, which is designed as a drive link, to slide along a surface, for example an arc-shaped, circular-segment-shaped or curved surface, in particular a guide rib 50 (shown in FIG. 3), of the base carrier 5 between the rest position 100 and the operating position 101.

In addition, a third link 73 can be provided. The third link 73 is, for example, articulated between the housing unit 8 and the closure element 9. The third link 73 is a connecting link that connects the closure element 9 to the housing unit 8 or to the sensor unit 6. The third link 73 is arranged perpendicular to the opening plane of an opening 51 or a closure plane of the closure element 9 in the rest position 100 of the device 2, in particular a closed position.

Furthermore, the first link 71 may be articulated to an outer side of the housing unit 8. The second link 72 is articulated to an outer side of the housing unit 8 opposite to this outer side, as shown in FIG. 6.

For example, the respective link 70 can be designed as a single link, in particular a simple rod link or a simple bow link, each with two joints 700. In particular, the respective link 70 can be designed as a lever which is rotationally coupled to the housing unit 8 on one or both sides. For example, a link 70 that is rotationally articulated on one side on the housing unit 8 is designed as a simple rod with two ends angled in opposite directions as a pivot. A link 70 which is rotationally coupled to the housing unit 8 on both sides is designed, for example, as a U-shaped profile with two inwardly angled free ends which serve as pivots.

The first link 71, in particular an upper link 70 or one furthest from the opening 51, and the second link 72, in particular a lower link 70 or one closer to the opening 51, are each articulated between the housing unit 8 and the base support 5. The third link 73 is articulated between the housing unit 8 and the closure element 9.

The first link 71 (also called upper link) is, for example, a simple rod link which is articulated with a first link end 711 to the base support 5, in particular to an upper end of the base support 5, and with a second link end 712 to the housing unit 8, in particular to an upper end of the housing unit 8. The first link 71 is in particular a flat profile or a strip profile with hinge pins projecting in opposite directions at the link ends 711 and 712 with associated axes of rotation 713 and 714.

The second link 72 (also called central link) is, for example, a simple rod link which is articulated with a first link end 721 on the base support 5, in particular on a housing end facing away from the opening 51 or centrally on the base support 5, and with a second link end 722 on the housing unit 8, in particular on a housing end facing away from the opening 51 or centrally on the housing unit 8. The second link 72 is in particular a wire profile or a strip profile with hinge pins projecting in opposite directions at the link ends 721 and 722 with associated axes of rotation 723 and 724.

The third link 73 (also called lower link or connecting link) is, for example, a simple rod link which is articulated with a first link end 731 to the base member 5, in particular at a lower end of the base member 5, and with a second link end 732 to the closure element 9, in particular centrally on the closure element 9.

Figure 5:
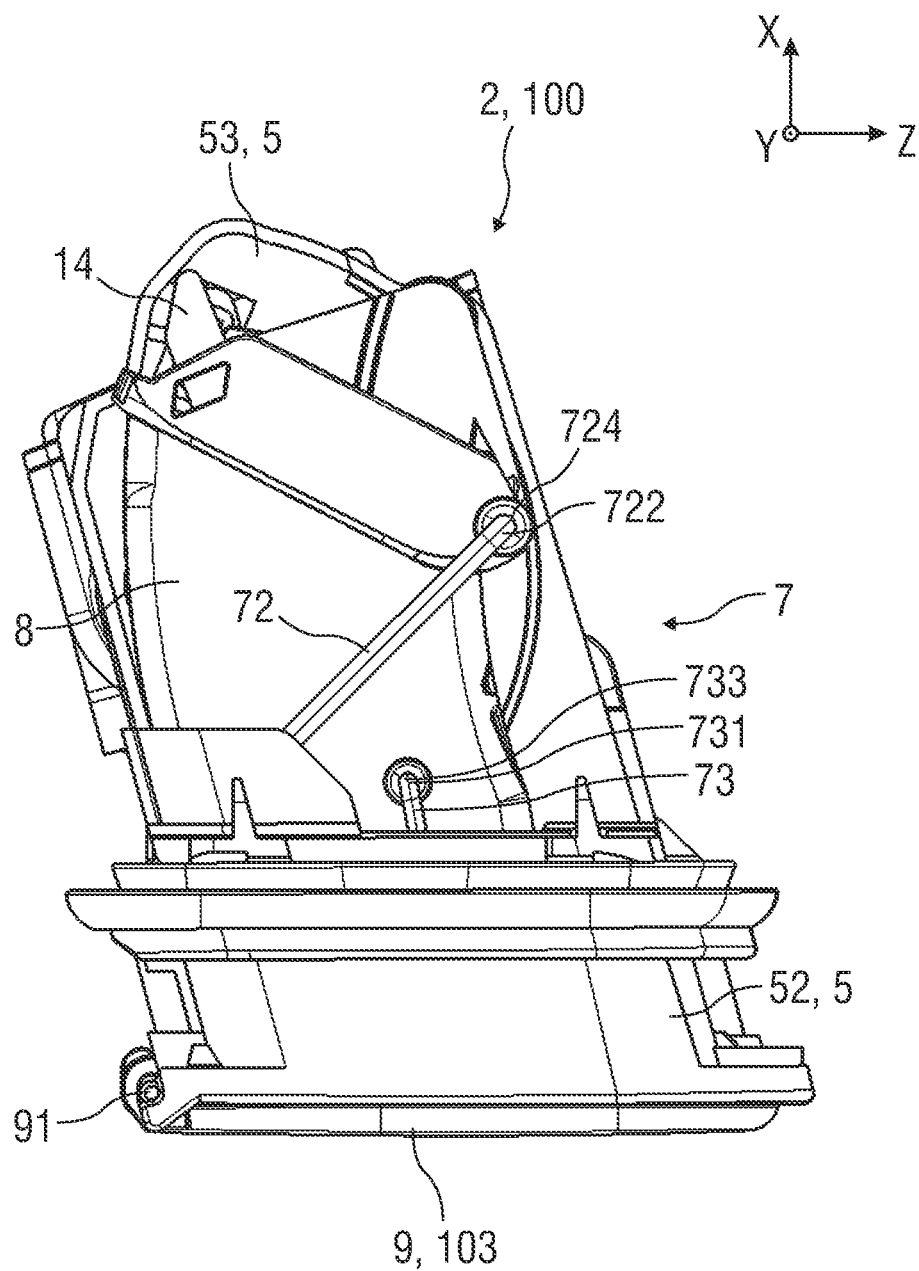
FIG. 5 is a further schematic side view of the device according to the invention with the sensor unit in the rest position.

The third link 73 is in particular a wire profile or a strip profile with hinge pins projecting oppositely at the link ends 731 and 732 (shown in FIGS. 5 and 6) with associated axes of rotation 733 and 734 (shown in FIGS. 5 and 6).

The first link 71 and the second link 72 are parallel and spaced apart in the rest position 100 of the device 2. The first link 71 has a shorter length than the second link 72. A first link end 721 of the second link 72 is arranged between a first link end 711 and a second link end 712 of the first link 71, as seen in the longitudinal direction X.

In the rest position 100 of the device 2, the third link 73 is arranged approximately perpendicular to the opening plane of the opening 51 or closure plane of the closure element 9. A first link end 731 of the third link 73 is arranged between a first link end 721 and a second link end 722 of the second link 72, as seen in the longitudinal direction X.

The housing unit 8 has an arc shape.

The base support 5 is a fixed component which can be mounted in a fixed position on a vehicle element, for example the bonnet 3. The base support 5 can be made of one or more parts.

The link mechanism 7 is designed to guide the movement of the housing unit 8 relative to the base member 5. The link mechanism 7 is arranged between the housing unit 8 and the base support 5 and/or between the housing unit 8 and the closure element 9.

The base carrier 5 comprises a front carrier part 52, which comprises the closable opening 51. In addition, the base carrier 5 may have a rear carrier part 53. The opening 51 can be closed by means of the closure element 9, in particular a protective element, a cover or a flap.

In FIG. 2, the closure element 9 is in a closed position in which the closure element 9 closes off the opening 51, in particular in a media-tight manner, from the surroundings. In this case, the closure element 9 lies in the opening 51, sealing it against an inner wall of the opening 51. The closure element 9 is rotatably mounted at a bearing end 91 on the base support 5 (as shown) or on the housing unit 8.

The sensor unit 6 is shown in the rest position 100 in FIG. 2. The rest position 100 is a protected position when not in use. In this rest position 100, the sensor unit 6 is protected inside the base support 5, in particular in the housing unit 8, behind the opening 51 (shown in FIG. 2) and covered by the locking element 9.

The sensor unit 6 can be moved between the rest position 100 and the operating position 101 (shown in FIG. 11), in particular an operating position in use. The sensor unit 6 comprises, for example, a camera as a sensor for detecting and monitoring an area around a vehicle component. Preferably, the camera is a front camera on the bonnet 3 or a rear camera on the boot lid 4.

To adjust the sensor unit 6 relative to the base carrier 5 between the rest position 100 and the operating position 101, the link mechanism 7 designed as a multi-link mechanism is provided.

FIG. 3 shows a further schematic perspective view of the device 2 according to the invention with the second link 72 and the third link 73. The first link 71 is only partially shown. Only the second end 712 of the first link 71, which is articulated to the housing unit 8, is visible. A guide rib 50 is formed on a support wall 59 of the base support 5 to guide the first link 71. The second link end 712 of the first link 71 has, for example, a guide roller 50.1 which is guided along the guide rib 50 when the sensor unit 6 is retracted or extended.

For releasable attachment of the device 2 to the bonnet 3 (also called front bonnet, shown in FIG. 1) or to the boot lid 4 (shown in FIG. 1), this device 2 can have a releasable fastening means 14, in particular a latching hook or a latching arm.

Figure 4:
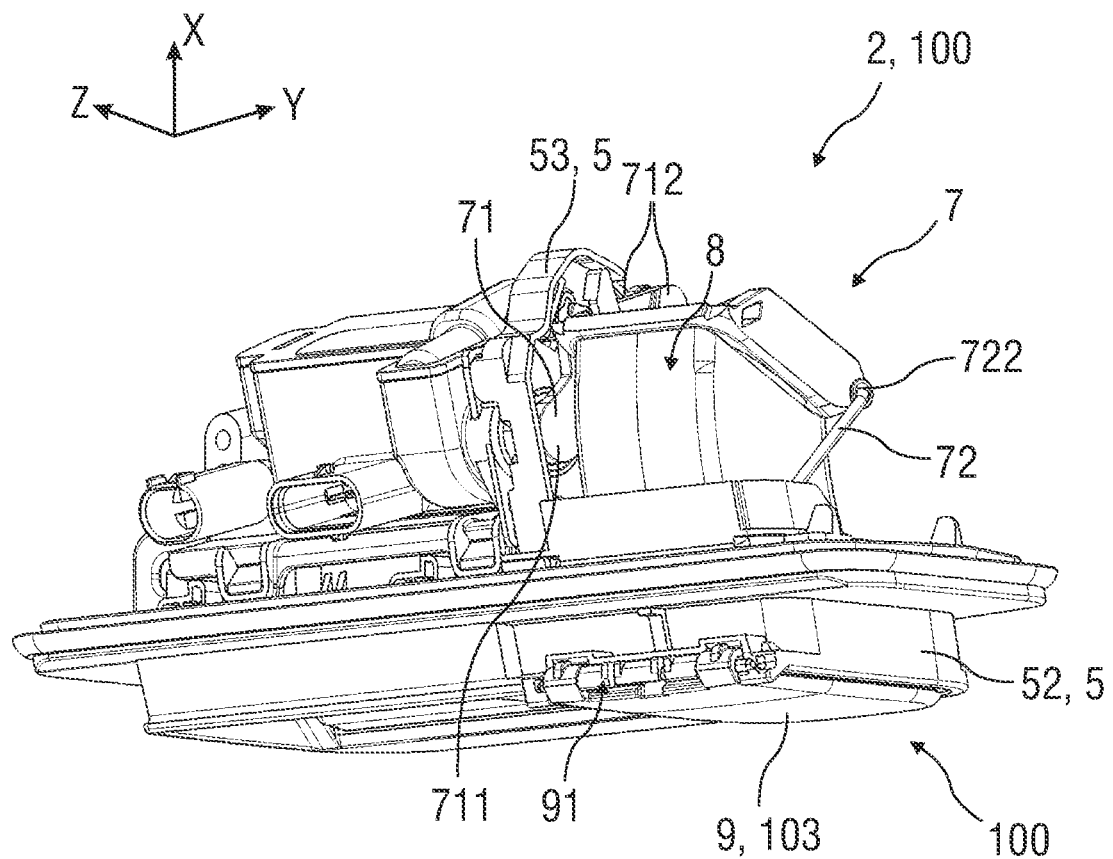
FIG. 4 is a further schematic perspective view of the device according to the invention with the sensor unit in the rest position.

FIG. 4 shows schematically in a further perspective view, obliquely from behind, the device 2 according to the invention with the sensor unit 6 (shown in FIG. 2 or 6) in the rest position 100.

FIG. 5 shows schematically in a further side view the device 2 according to the invention with the sensor unit 6 (shown in FIG. 2 or 6) in the rest position 100.

FIG. 6 shows a schematic perspective view of the device 2 according to the invention with the housing unit 8 with the sensor unit 6 in a partially extended position 102 (also called intermediate position).

In addition, plug openings 55, through which connection elements 15, in particular electrical connections, in particular for power supply, and/or electronic connections, in particular a LAN connection or CAN connection or another communication connection, for the drive 11 project, can be provided in the base support 5.

In addition, further fastening means 16, in particular latching lugs or latching arms or the like, can be provided on the base support 5 in order to arrange it in a form-fitting and/or force-fitting manner on the bonnet 3 (also called front bonnet, shown in FIG. 1) or on the boot lid 4 (shown in FIG. 1) and to fasten it detachably.

The electric drive 11, in particular an electric motor, is provided for adjusting the housing unit 8. The drive 11 can be arranged in a protected manner in a carrier receptacle, serving as a housing 17, of the base carrier 5 or of a separate subcarrier, in particular an electrical component carrier.

The base carrier 5 comprises the front carrier part 52, which comprises the closable opening 51 closable by the closure element 9. In addition, the base carrier 5 comprises the rear carrier part 53.

Furthermore, the base carrier 5, in particular the front carrier part 52, comprises an edge 56 which surrounds both the opening 51 for the sensor unit 6 and a carrier region 57 for the drive 11. The circumferential edge 56 may furthermore be provided with a circumferential seal 57, in particular a circumferential sealing lip. For example, the seal 57 may be formed separately as a sealing ring or as an integrated seal 57, in particular formed onto the edge 56.

The base support 5 can also be provided with reinforcing elements 58, in particular ribs, webs, grooves or the like.

FIG. 7 shows schematically in a further perspective view the device 2 according to the invention with the housing unit 8 with the sensor unit 6 in the partially extended position 102.

The drive 11 can be arranged in a separate housing 17, in particular a partial housing, for example a separate electrical component carrier. The drive 11 with its housing 17 can be arranged on one side of a carrier wall 59 of the base carrier 5. The adjustable sensor unit 8 with its housing unit 8 can be arranged on an opposite side of the carrier wall 59.

In addition, further connection elements 18, in particular electrical connections, in particular for the power supply, and/or electronic connections, in particular a LAN connection or a CAN connection or another communication connection, can be provided for the drive 11 or another component of the device 2.

FIG. 8 shows schematically in side view the device 2 according to the invention with the housing unit 8 with the sensor unit 6 in the partially extended position 102.

The link mechanism 7 comprises the three links 71, 72 and 73, which simultaneously execute their arcuate partial movements 201 to 203 during an adjustment movement, the arcuate partial movements 201 and 202 being superimposed on the arcuate movement 200 of the housing unit 8 with sensor unit 6 or of the sensor unit 6 only. The arcuate partial movement 203 represents the opening movement of the closure element 9.

The guide rib 50 is formed on the support wall 59 to guide the arcuate partial movement 201 of the first link 71. The second link end 712 of the first link 71 has, for example, a guide pin (not shown in more detail) or a guide roller 50.1 (shown in FIG. 3), which is guided along the guide rib 50.

Figure 9:
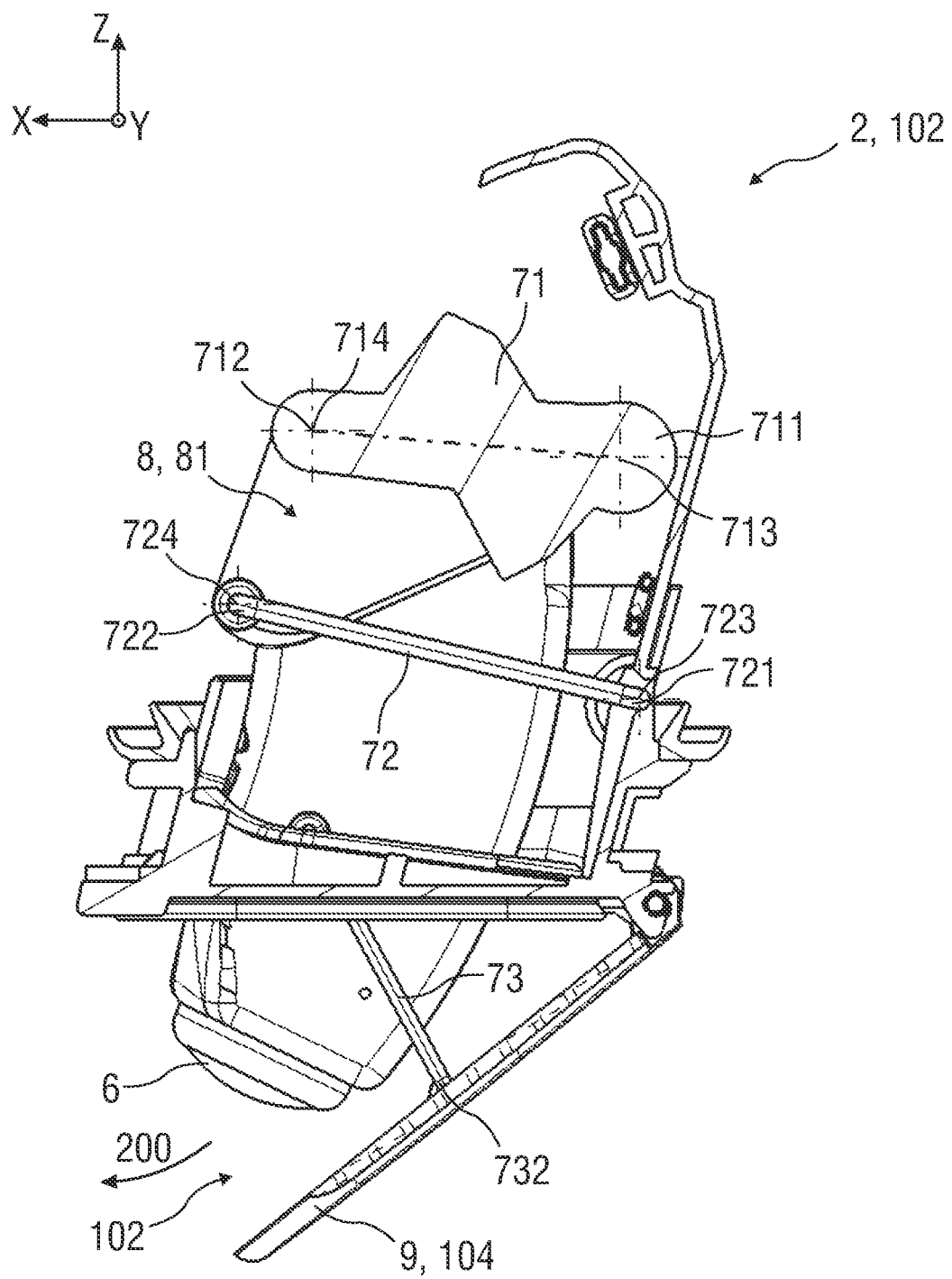
FIG. 9 is a further schematic side view of the device according to the invention with the sensor unit in the partially extended position.

FIG. 9 shows schematically in a further side view the device 2 according to the invention with the housing unit 8 with the sensor unit 6 in the partially extended position 102. The second link 72 and the third link 73 are articulated to a first housing side 81 of the housing unit 8. The first link 71 is shown in dashed lines and is articulated to a second housing side 82 (shown in FIGS. 10 and 11), the opposite side of the housing unit 8.

Figure 10:
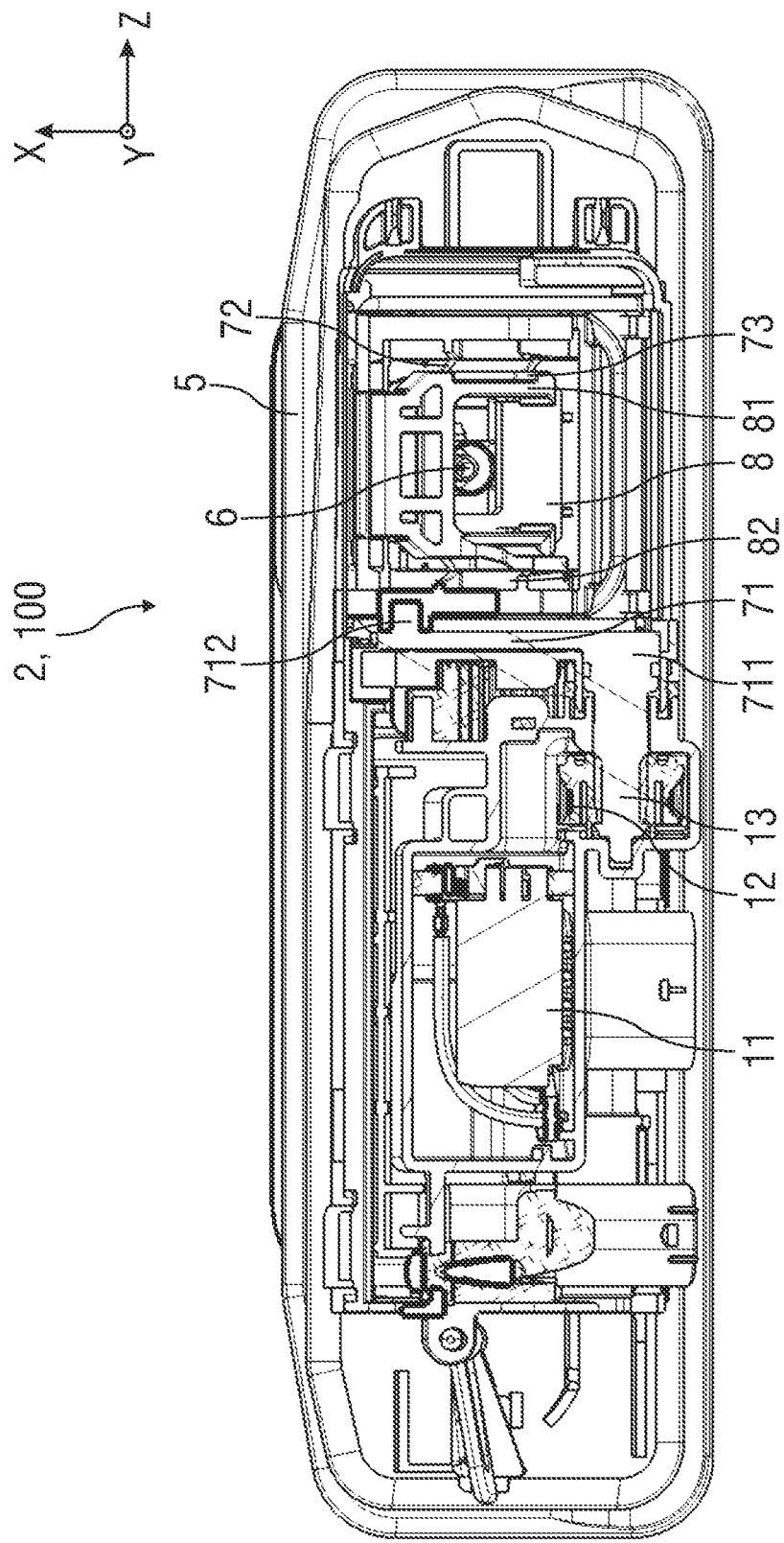
FIG. 10 is a schematic sectional view of the device according to the invention with the sensor unit in the partially extended position.

FIG. 10 shows a sectional view of the device 2 with the housing unit 8 with the sensor unit 6 in the half-open or partially extended position 102. The sensor unit 6 is moved continuously between its rest position 100 (shown in FIGS. 2 to 6) and its operating position 101 (shown in FIGS. 11 to 14), for example by means of the drive 11, in particular an electric drive motor. To illustrate the processes involved in this movement, the partially extended position 102 is shown as a snapshot.

The drive 11 is motion-coupled via a transmission 12, for example, to the first link 71 via an output shaft 13.

Figure 11:
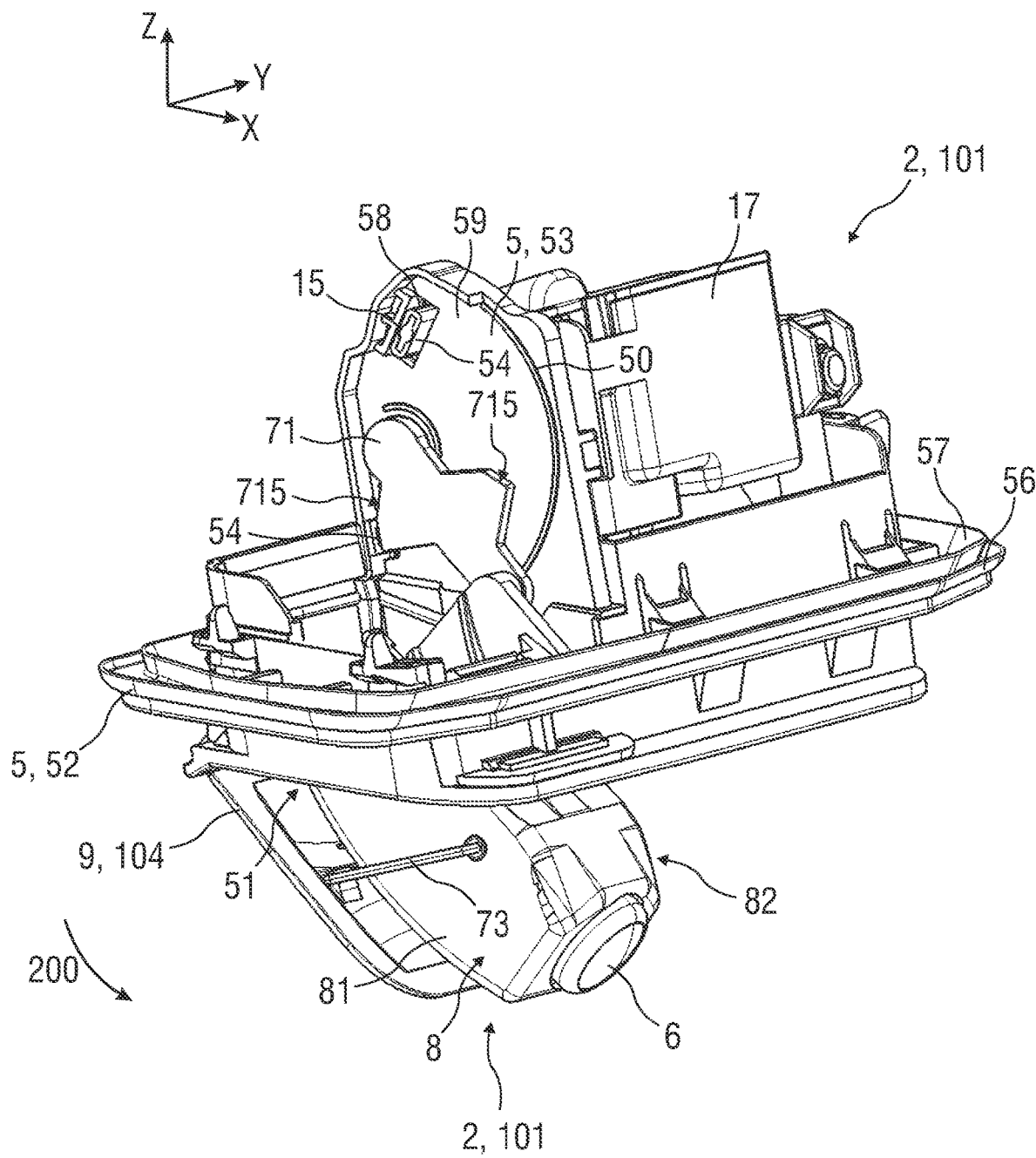
FIG. 11 is a schematic perspective view of the device according to the invention with the housing unit with the sensor unit in a fully extended position, in particular an operating position.

FIG. 11 shows a schematic perspective view of the device 2 according to the invention with the housing unit 8 with the sensor unit 6 in a fully extended position, in particular in the second position or operating position 101. The first link 71 has first projections 715 which serve as stops for limiting the retraction movement and extension movement of the housing unit 8 according to arrow 200. The projections 715 each abut on corresponding end stops 54 on the base support 5.

Figure 12:
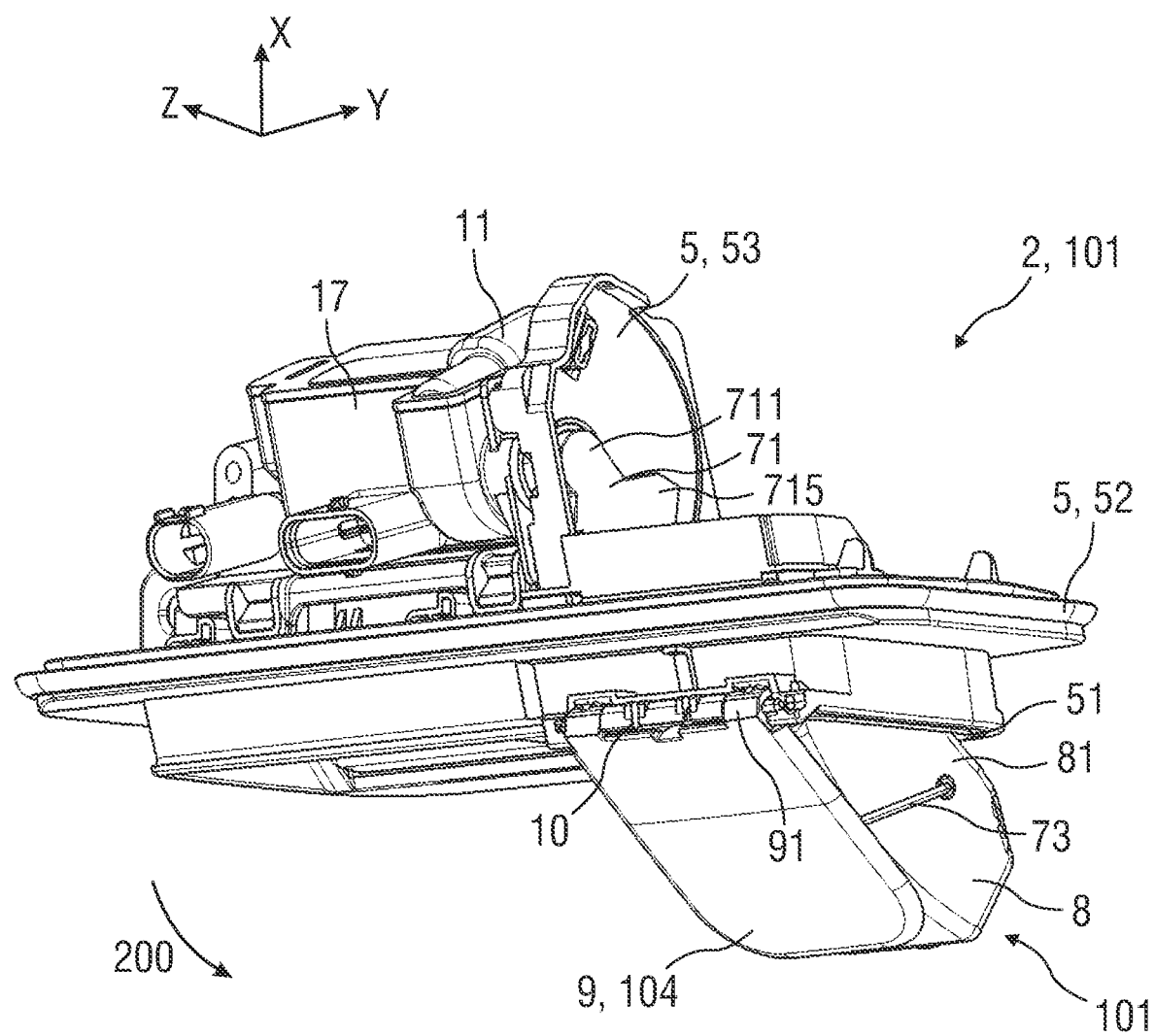
FIG. 12 is a further schematic perspective view of the device according to the invention with the housing unit with the sensor unit in the fully extended position, in particular the operating position.

FIG. 12 shows schematically in a further perspective view the device 2 according to the invention with the housing unit 8 with the sensor unit 6 (shown in FIG. 11) in the fully extended position, in particular in the second position or operating position 101. The closure element 9 can furthermore be supported in a spring-preloaded manner in the region of the bearing end 91. For example, a spring element 10, in particular a helical spring, can be arranged in the region of the bearing end 91. By means of the spring element 10, the closure element 9 is kept spring-preloaded in the rest position 100 of the device 2 and thus in the position closing the opening 51, in particular kept low-noise and rattle-free.

Figure 13:
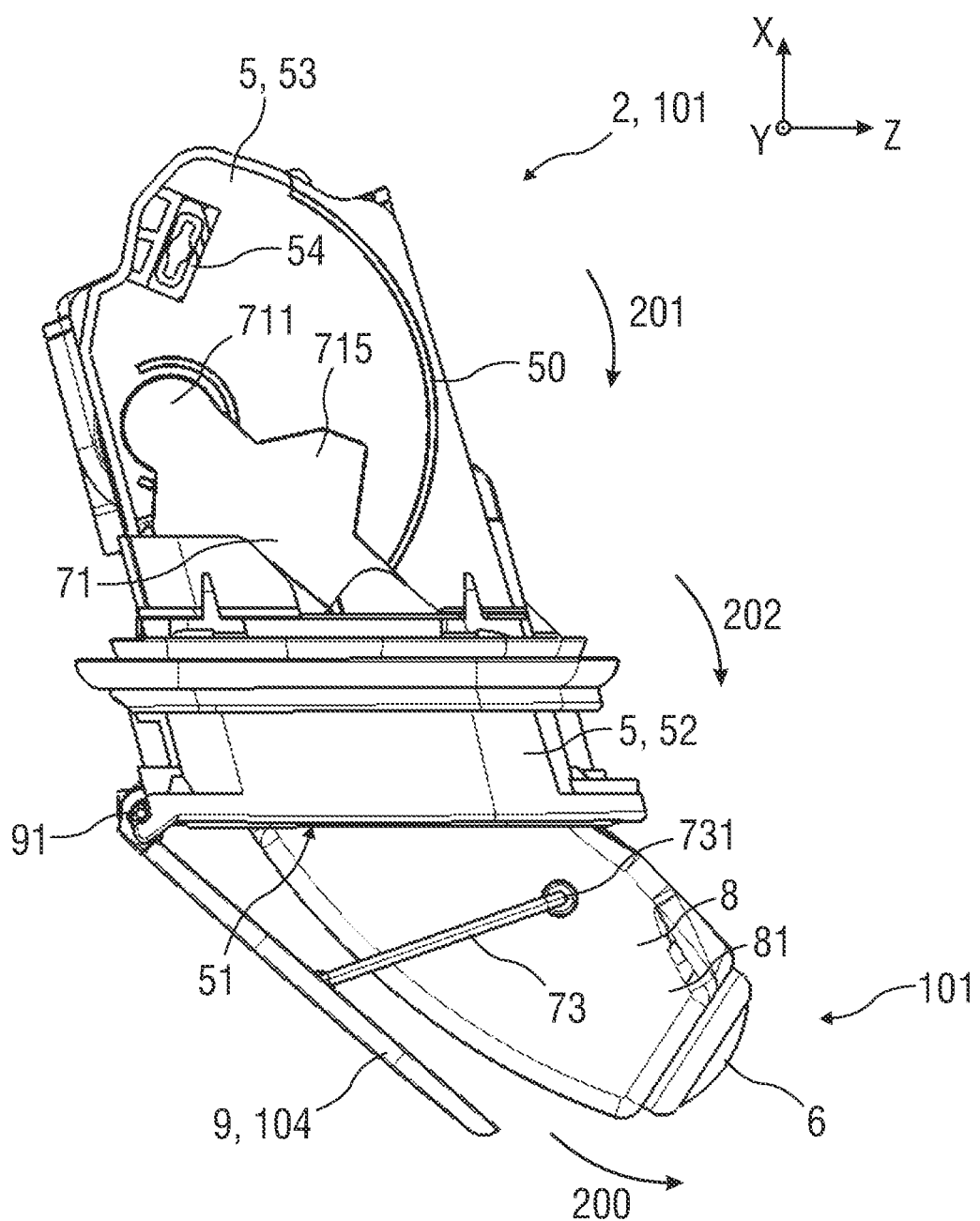
FIG. 13 is a schematic side view of the device according to the invention with the sensor unit in the fully extended position, in particular the operating position.

FIG. 13 shows a schematic side view of the device 2 according to the invention with the housing unit 8 with the sensor unit 6 in the fully extended position, in particular in the second position or operating position 101.

Figure 14:
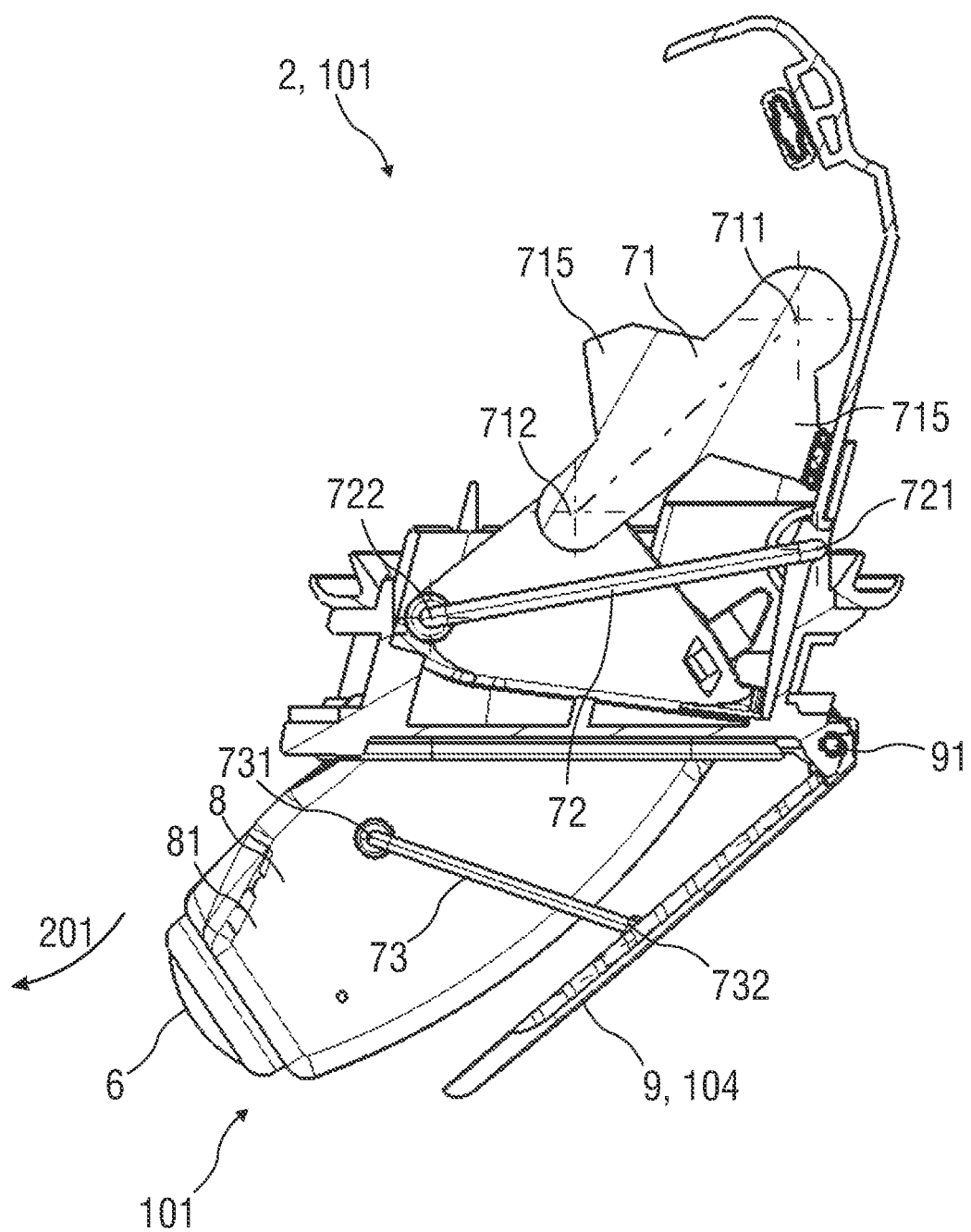
FIG. 14 is a further schematic side view of the device according to the invention with the sensor unit in the fully extended position, in particular the operating position.

FIG. 14 shows schematically in a further side view the device 2 according to the invention with the housing unit 8 with the sensor unit 6 in the fully extended position, in particular in the second position or operating position 101.

Figure 15:
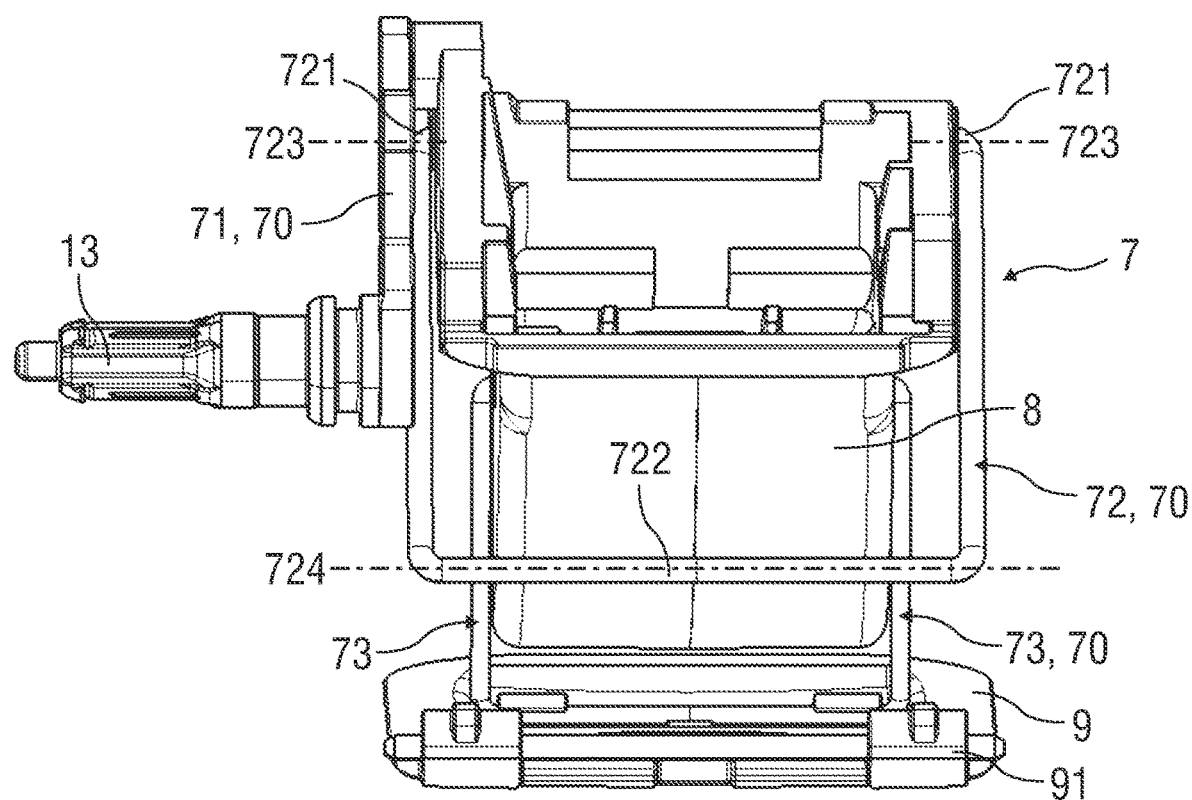
FIG. 15 is a schematic side view of the housing unit with the multi-link mechanism and without the sensor unit and without the base support.

FIG. 15 shows a schematic side view of the housing unit 8 with the link mechanism 7, in particular the multi-link mechanism with the links 70, and without the sensor unit 6 and without the base support 5. The second link 72 can, for example, be designed as a bow link. The first link 71 is the drive link which is motion-coupled to the output shaft 13 of the drive 11. The second link 72 and the third link 73 are motion-coupled to the first link 71 due to the connection via the housing unit 8 and are designed as output links.

Figure 16:
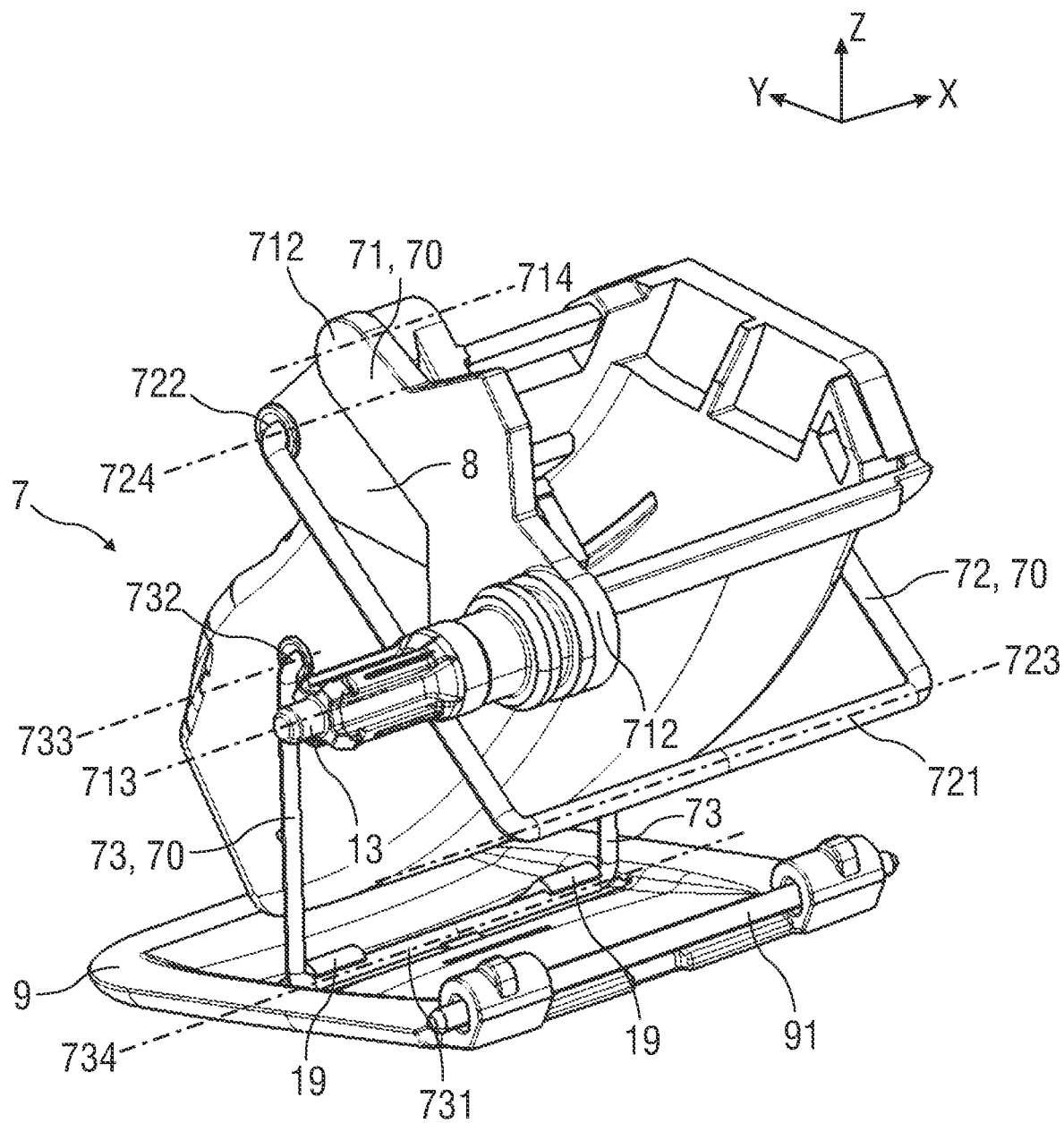
FIG. 16 is a schematic perspective view of the housing unit with the multi-link mechanism and without sensor unit and without base support.

FIG. 16 shows a schematic perspective view of the housing unit 8 with the link mechanism 7, in particular the multi-link mechanism with the links 70, and without the sensor unit 6 and without the base carrier 5. The second link 72 and the third link 73 are designed as bow links. The second link ends 722 and 732 of the bow-shaped second link 72 and the bow-shaped third link 73 are articulated on both sides to the housing unit 8. Their respective opposite first link ends 721 and 731, in particular a rod connecting the links, are simply articulated to the base support 5 (shown in FIGS. 2 and 3) or to the locking element 9. For example, latching tongues 19 are provided for movably, in particular rotatably, receiving the first link ends 721 and 731.

The first link 71 is a rod link and is articulated on one side to the housing unit 8 and on one side to the base support 5 (shown in FIGS. 2 and 3).

Figure 17:
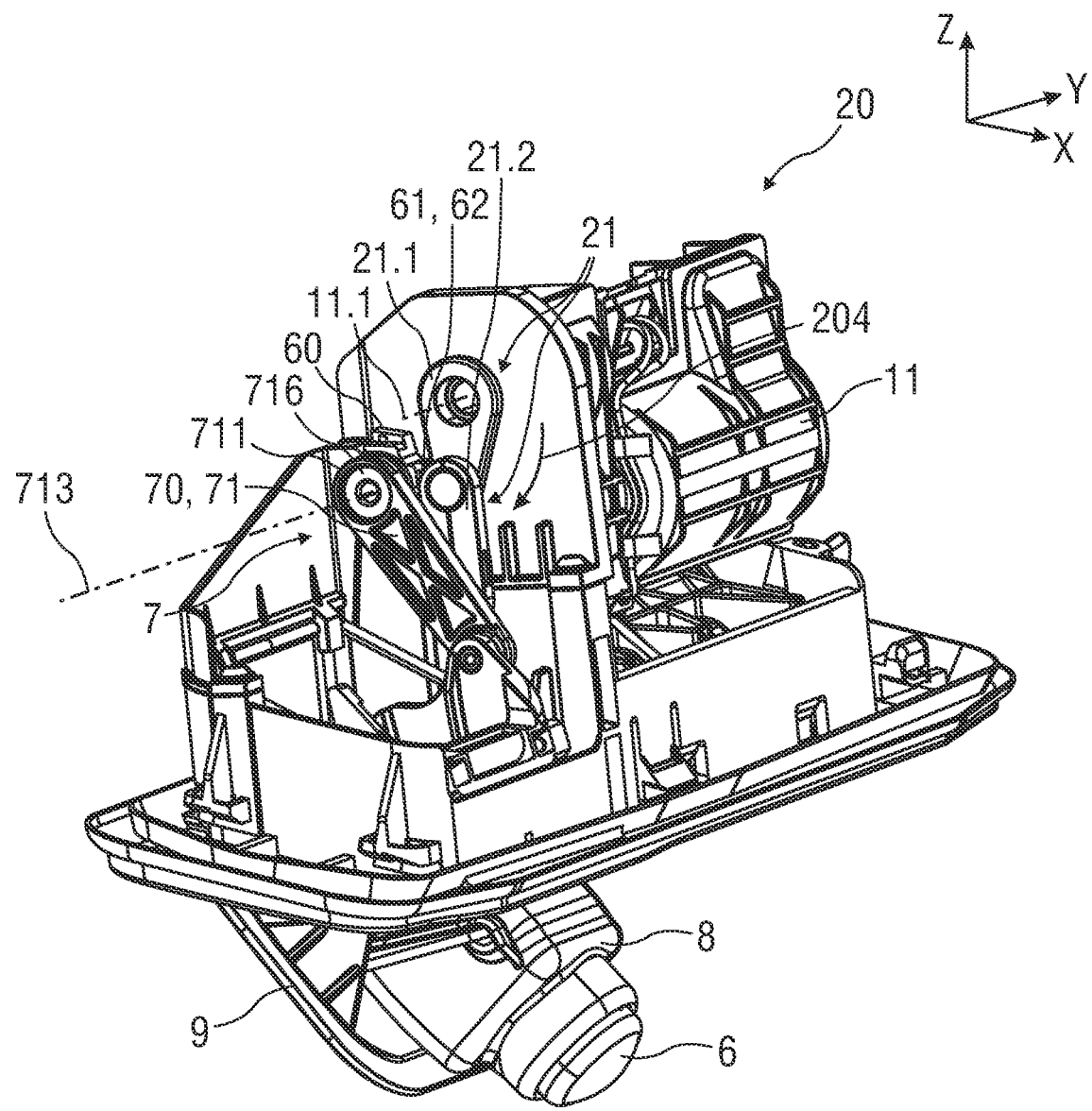
FIG. 17 is a schematic perspective view of an alternative embodiment of a device with an indirect drive.

FIG. 17 shows a schematic perspective view of an alternative embodiment of a device 20 with the drive 11 and indirect coupling with the link mechanism 7 and its links 70.

The device 20 differs from the previously described device 2 only in the coupling of the drive 11 with the link mechanism 7—directly for the device 2 and indirectly for the device 20. In the following, only the differences are described in detail. The matching components of the devices 2 and 20 have been described previously with reference to FIGS. 1 to 16.

As shown in FIG. 17, the drive 11 is indirectly motion-coupled via an intermediate link mechanism 21 to the first link 71 of the link mechanism 7 for adjusting the sensor unit 6 or the housing unit 8 with sensor unit 6 (as shown).

The first link 71, which is designed as a drive link, is indirectly driven by a drive lever 21.1 of the intermediate link mechanism 21.

With the indirect coupling of drive 11 and first link 71 via the intermediate link mechanism 21, the output axis 11.1 of the drive 11 and the link axis (=the stationary axis of rotation 713) of the first link 71 are arranged offset to each other.

In the case of indirect coupling, the drive 11, the drive lever 21.1 of the intermediate link mechanism 21 and the first link 71, which is designed as a drive link, can move in the same direction 204.

In the case of indirect coupling of the drive 11 and the first link 71, the intermediate link mechanism 21 is arranged between the drive 11 and the first link 71 designed as a drive link. The intermediate link mechanism 21 may, for example, be in the form of a toggle mechanism. In particular, it is a toggle mechanism with a dead centre position.

In the extended state (the operating position 101, as shown in FIG. 17) and/or in the retracted state (the rest position 100, as shown in FIG. 2) of the sensor unit 6, it is securely fixed (also called "locked") by means of the toggle mechanism. In particular, the sensor unit 6 is fixed in one of its end positions by means of the intermediate link mechanism 21 in such a way that this position cannot be opened or closed simply by hand or by vehicle vibrations. Alternatively, a self-locking gearbox can be provided instead of the toggle mechanism.

A first lever of the intermediate link mechanism 21, for example designed as a toggle mechanism, forms the drive lever 21.1. A second lever of the intermediate link mechanism 21, for example designed as a toggle mechanism, forms an output lever 21.2. The drive lever 21.1 is coupled to the drive 11, in particular its mechanical output. The output lever 21.2 is in turn coupled to the first link 71 designed as a drive link.

Preferably, the intermediate link mechanism 21 designed as a toggle mechanism can be designed as a bistable toggle mechanism. For example, the bistable toggle mechanism may have two positions: a first stable position and a second stable position. The first stable position corresponds to the rest position 100 of the sensor unit 6 and/or the locking position 103 of the closure element 9, shown analogously in FIG. 2. The second stable position corresponds to the operating position 101 of the sensor unit 6 and/or the releasing position 104 of the closure element 9, shown in FIG. 17.

The movement of the drive 11 indirectly via the intermediate link mechanism 21 causes the first link 71, which is designed as a drive link, to slide along the, for example, arc-shaped, circular-segment-shaped or curved surface, in particular the guide rib 50, of the base support 5 between the rest position 100 and the operating position 101. The design of the intermediate link mechanism 21 as a bistable toggle mechanism allows it to be fixed in each of its end positions, the rest position 100 and the operating position 101.

A pin 716 is provided at the first link end 711 of the first link 71 for stationary mounting in the base support 5 (shown in FIG. 17).

A bearing 60 is provided for the stationary mounting of the pin 716. The bearing 60 can also be designed as a separate end stop 61 for limiting the movement of the intermediate link mechanism 21 and/or the first link 71. For example, the bearing 60 has at least one radial projection 62 as a separate end stop 61.

Figure 18:
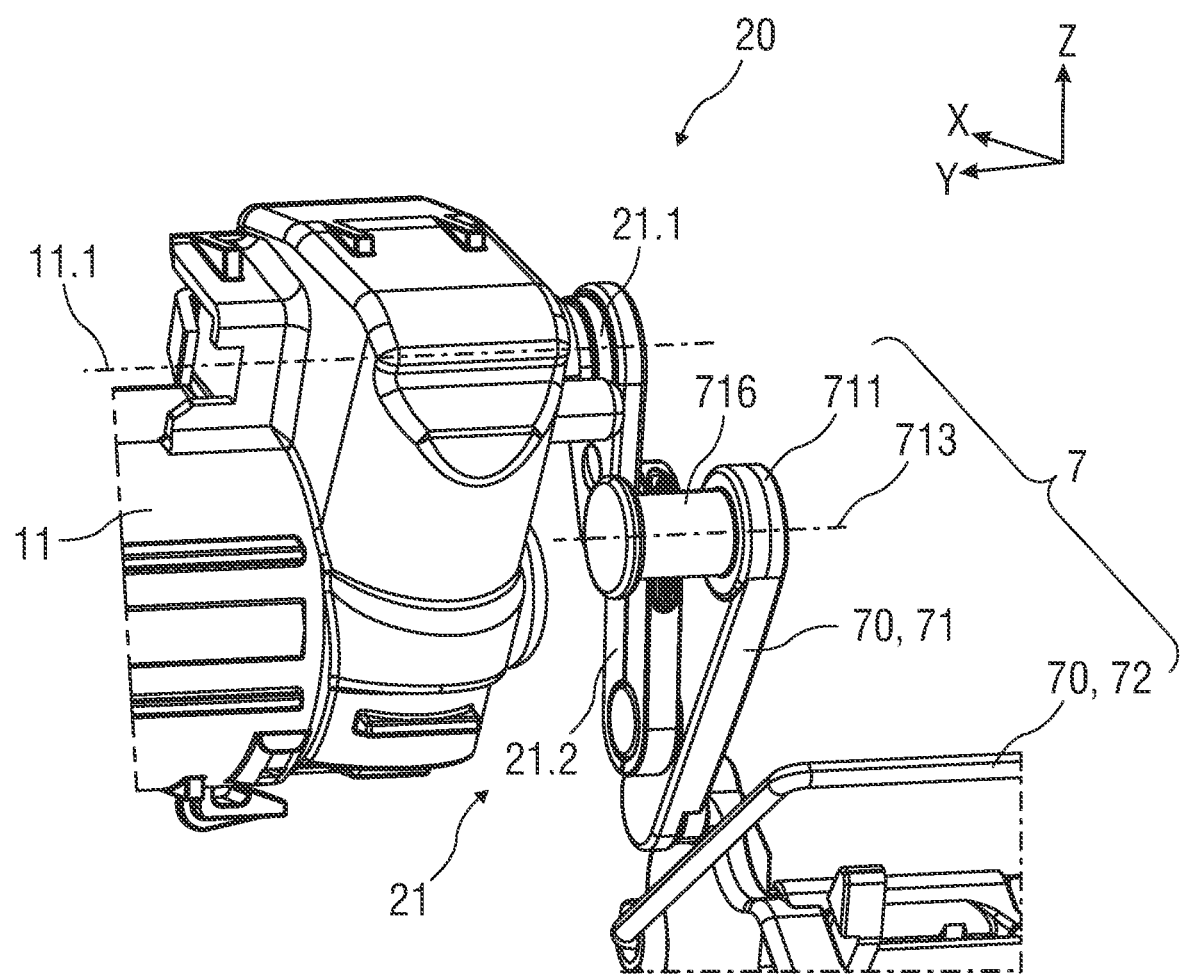
FIG. 18 is a schematic view of the device according to FIG. 17 without base support in the extended position or operating position.

FIG. 18 schematically shows the device 20 according to FIG. 17 without the base support 5 in the extended position, the operating position 101.

LIST OF REFERENCES 1 vehicle
2 device
3 engine bonnet
4 boot lid
5 base carrier
6 sensor unit
7 link mechanism
8 housing unit
9 locking element
10 spring element
11 drive
11.1 output axis
12 gearbox
13 output shaft
14 fastening means
15 mounting brackets
16 further fastening m
17 housing
18 further connecting element
19 latching tongue
20 alternative device
21 intermediate link mechanism
21.1 drive lever
21.2 output lever
50 guide rib
50.1 guide roller
51 opening
52 front carrier part
53 rear carrier part
54 end stop
55 plug opening
56 rim
57 seal
58 reinforcing element
59 support wall
60 bearing
61 separate end stop
62 radial projection
70 link
700 joint
71 first link
711, 712 link end
713, 714 axis or rotation
715 projection
716 pin
72 second link
721, 722 link end
723, 724 axis of rotation
73 third link
731, 732 link end
733, 734 axis of rotation
81 first housing side
82 second housing side
91 bearing end
100 rest position of the sensor unit
101 operating position of the sensor unit
102 intermediate position of the sensor unit
103 closing position
104 releasing position
200 arcuate movement of the housing unit/sensor unit
201 partial arcuate movement of the link mechanism
202 partial arcuate movement of the link mechanism
203 partial arcuate movement of the locking element
204 direction of rotation
X longitudinal direction
Y transverse direction
Z vertical direction

What is claimed is:

1. A device for a motor vehicle, comprising:
a base support with an opening and a movable closure element for opening or closing the opening,
a sensor unit with a housing unit holding this sensor unit, which is movably arranged in the base support, and
a link mechanism,
wherein the housing unit is movable via the link mechanism in the base support between a first position and a second position in which the housing unit with the sensor unit projects at least partially out of the opening, and
wherein the link mechanism is designed as a multi-link mechanism and comprises at least a first link, a second link and a third link, and the first link and the second link being in each case articulated by a first link end in a stationary manner on the base support and in each case being articulated by a second link end in a movable manner on the housing unit or the sensor unit, and the third link being articulated between the housing unit and the closure element or between the base support and the closure element, and
wherein provision is made of a drive which is indirectly coupled in terms of movement to the first link, which is in the form of a drive link, via an intermediate articulation mechanism, and
wherein the intermediate articulation mechanism has the form of a toggle-lever mechanism.

2. The device according to claim 1, wherein the first link with the first link end is articulated to a stationary axis of rotation on the base support and the second link with the second link end is articulated to a movable axis of rotation on the housing unit.

3. The device according to claim 2, wherein the multi-link mechanism is designed and set up in such a way that the housing unit performs a continuous extension movement when moving from the first position of the sensor unit to the second position of the sensor unit.

4. The device according to claim 3, wherein the multi-link mechanism is designed and set up in such a way that the housing unit executes a continuous arcuate extension movement when moving from a rest position of the sensor unit into an operating position of the sensor unit.

5. The device according to claim 4, wherein the multi-link mechanism is designed and set up in such a way, that simultaneously with an extension movement of the sensor unit from the rest position into the operating position, the closure element can be moved from a position closing the opening into a position releasing the opening or, conversely, with a retracting movement of the sensor unit from the operating position into the rest position, the closure element can be moved from the position releasing the opening into the position closing the opening.

6. The device according to claim 1, wherein the links are each formed as a single link with two joints each.

7. The device according to claim 1, wherein the respective link is formed as an L-shaped link, a U-shaped link, an I-shaped link or a rod-shaped link.

8. The device according to claim 1, wherein the links, which are designed as a rod link or I-shaped link, are each articulated on only one side of the housing unit.

9. The device according to claim 1, wherein at least two of the links articulated between the housing unit and the base support are substantially parallel and spaced apart in the rest position.

10. The device according to claim 1, wherein at least one of the links articulated between the housing unit and the closure element is arranged in the rest position substantially perpendicular to the opening plane of an opening or a closure plane of the closure element.

11. The device according to claim 1, wherein the housing unit has an arc shape.

12. The device according to claim 1, wherein the sensor unit is arranged perpendicular to the opening in the rest position.

13. The device according to claim 1, wherein a drive is provided which is motion-coupled directly to one of the links or indirectly via an intermediate link mechanism to this link.

14. The device according to any claim 1, wherein at least one end stop is provided for limiting an extending movement or a retracting movement of the housing unit and/or the sensor unit.

15. A vehicle with a device according to claim 1.

* * * * *